Jan. 27, 1959
M. BRANHAM
2,870,512
BLOCK MANUFACTURING MACHINE
Filed July 6, 1956
5 Sheets—Sheet 1
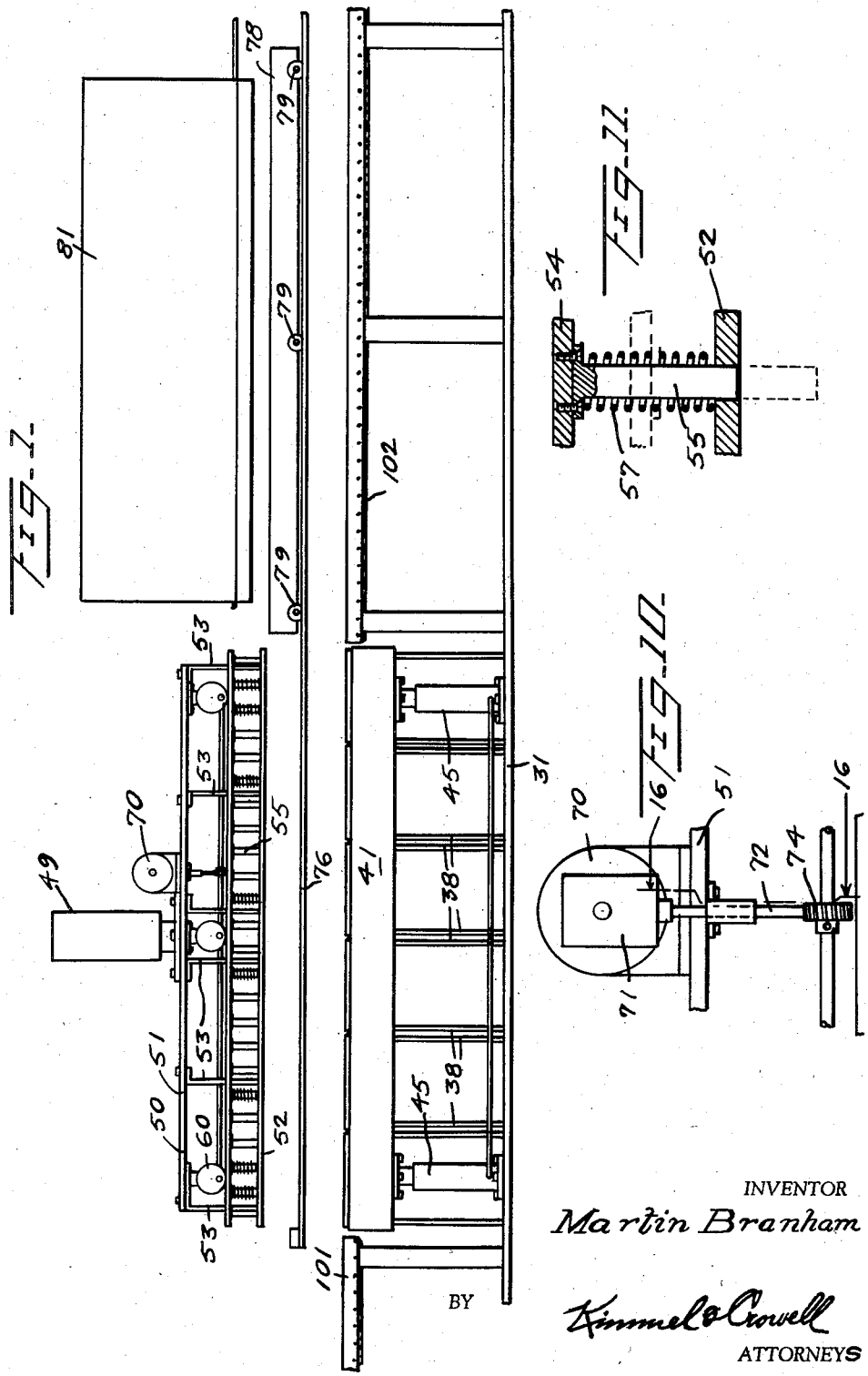
INVENTOR
Martin Branham
BY
Kimmel & Crowell
ATTORNEYS

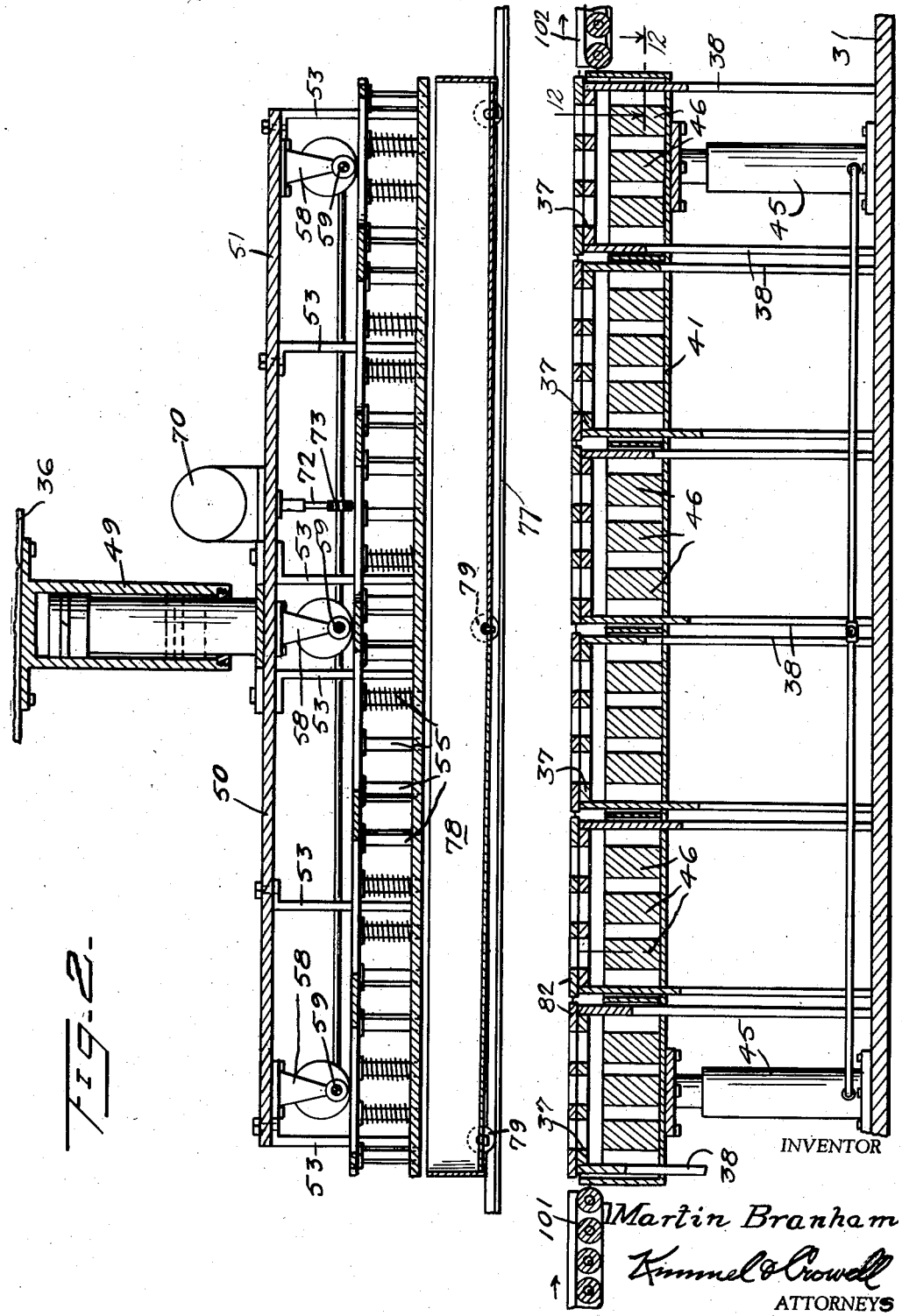

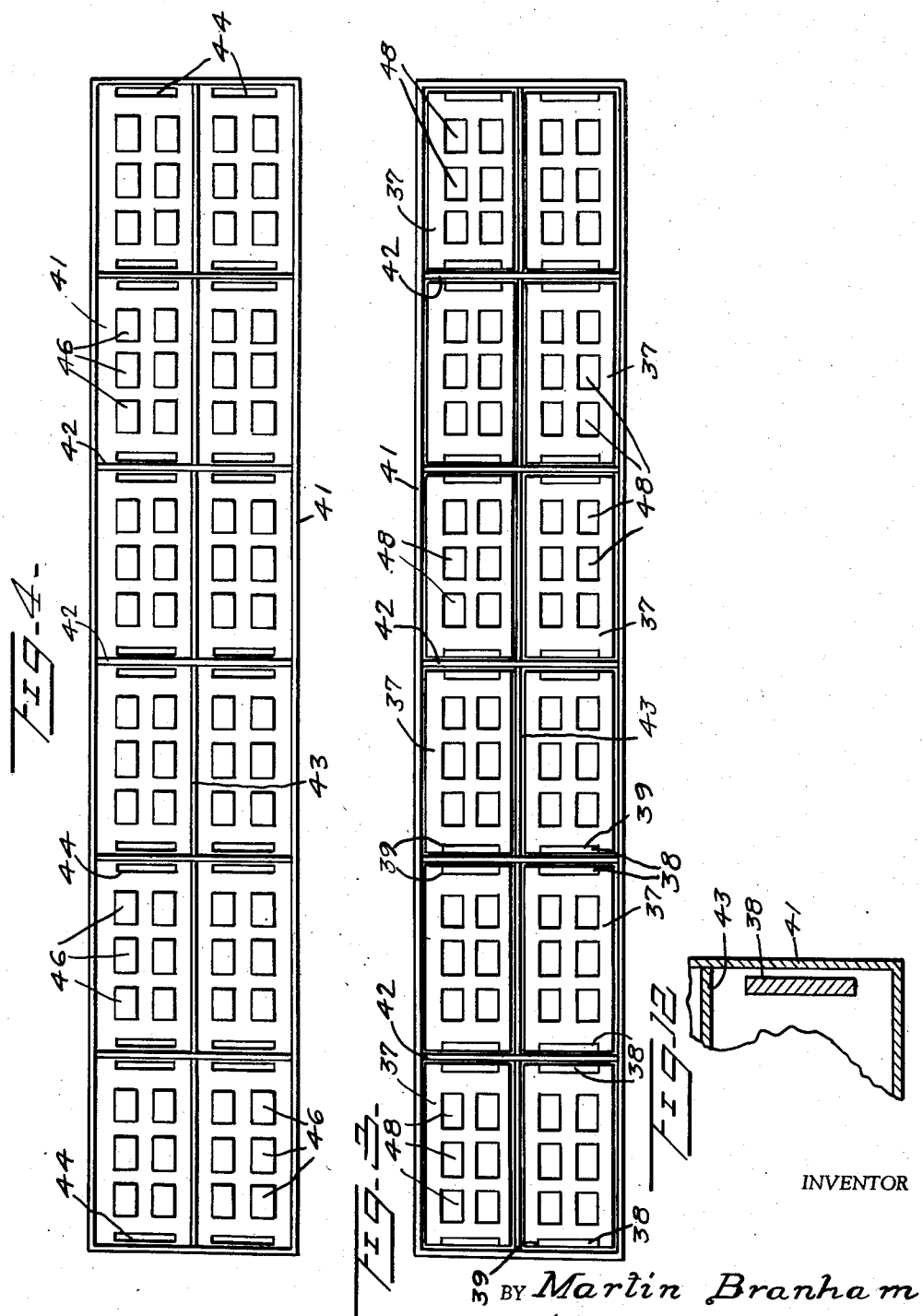

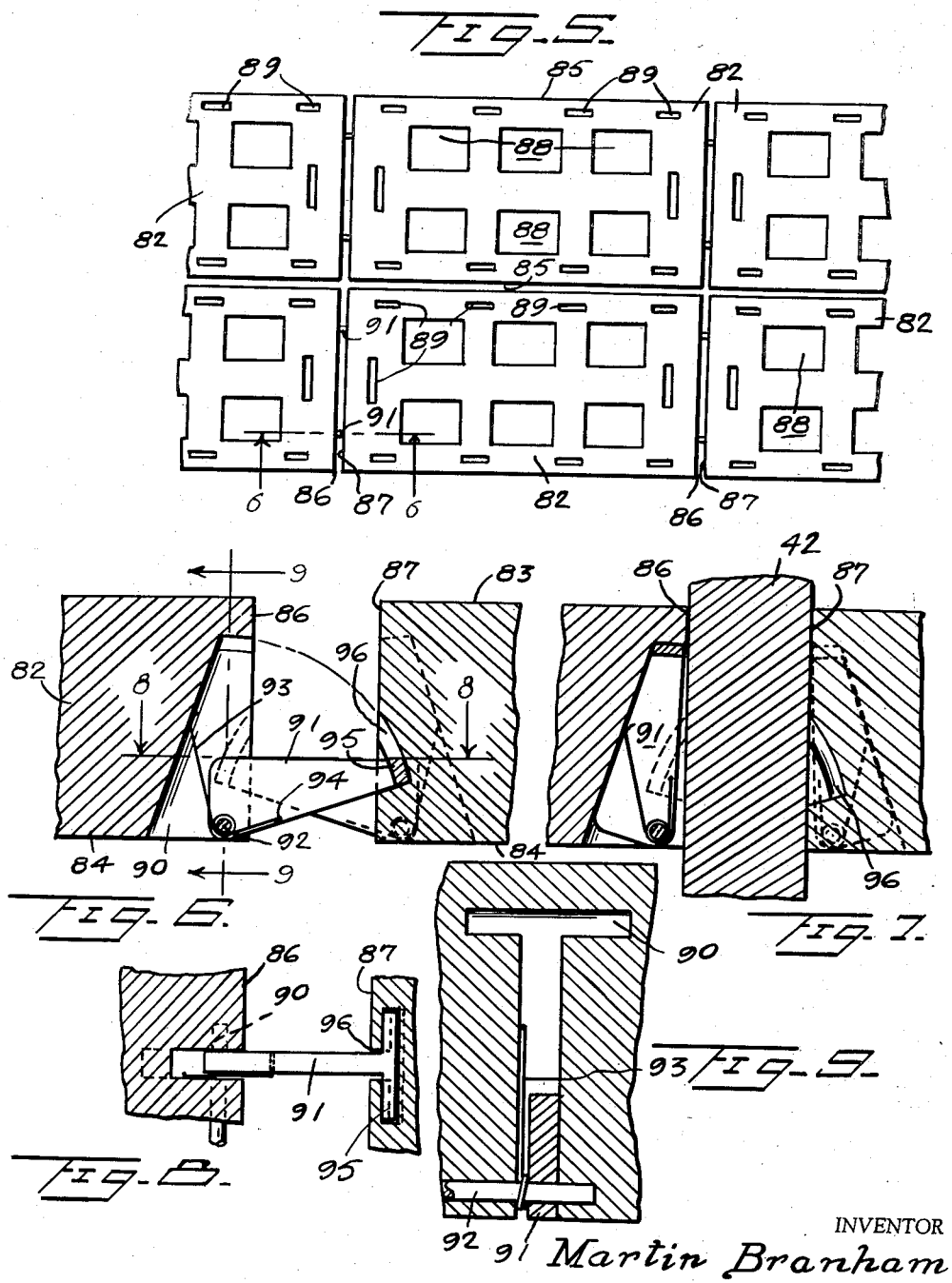

Jan. 27, 1959
M. BRANHAM
2,870,512
BLOCK MANUFACTURING MACHINE
Filed July 6, 1956
5 Sheets-Sheet 5
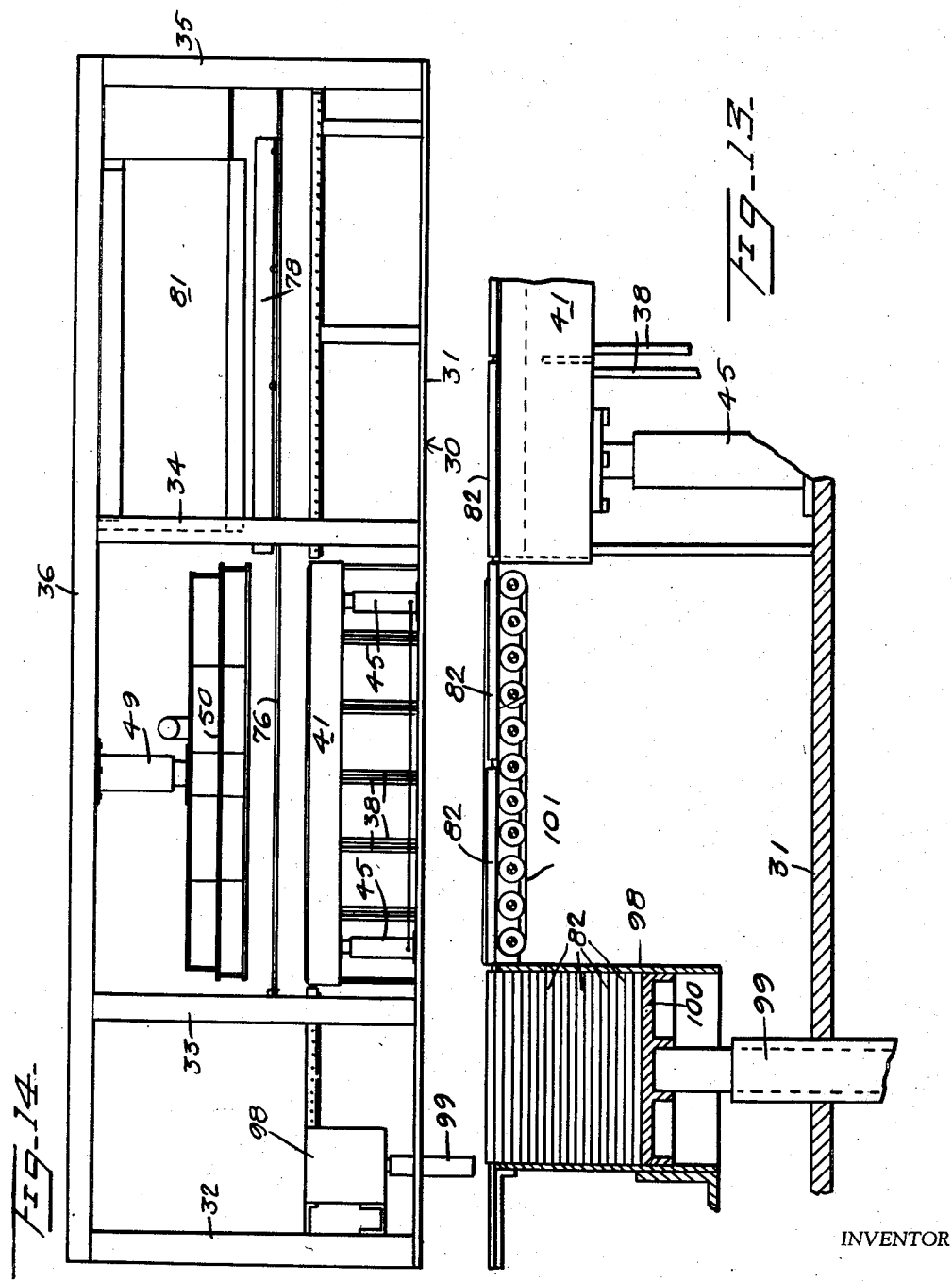
INVENTOR
Martin Branham
BY Kimmel & Crowell
ATTORNEYS

United States Patent Office 2,870,512
Patented Jan. 27, 1959

2,870,512

BLOCK MANUFACTURING MACHINE

Martin Branham, Pound, Va.

Application July 6, 1956, Serial No. 596,346

3 Claims. (Cl. 25—1)

The present invention relates to block manufacturing machines, and more particularly to machines for molding cementitious blocks on a production line basis.

The primary object of the invention is to provide a machine for manufacturing cementitious molded blocks in which the complete molding and removal steps of the block manufacturing process are carried on automatically.

Another object of the invention is to provide a block manufacturing machine in which block conveying pallets are automatically linked together following the formation of the block to permit the finished blocks to be automatically removed from the machine.

Another object of the invention is to provide a cement block manufacturing machine of the class described above which is inexpensive to manufacture, simple to use, and completely automatic in its action.

Other objects and advantages will become apparent in the following specification when considered in the light of the attached drawings, in which:

Figure 1 is a fragmentary side elevation of the invention.

Figure 2 is a fragmentary longitudinal cross-section.

Figure 3 is a plan view of the molds with the pallets in place.

Figure 4 is a plan view of the molds with the pallets removed.

Figure 5 is an enlarged fragmentary plan view of the pallets.

Figure 6 is an enlarged fragmentary longitudinal cross-section taken along the line 6—6 of Figure 5, looking in the direction of the arrows.

Figure 7 is a view similar to Figure 6 showing the pallet connectors in disconnected position.

Figure 8 is a fragmentary horizontal cross-section taken along the line 8—8 of Figure 6, looking in the direction of the arrows.

Figure 9 is an enlarged transverse cross-section taken along the line 9—9 of Figure 6, looking in the direction of the arrows.

Figure 10 is an enlarged fragmentary front elevation illustrating the blade drive on the packing head.

Figure 11 is an enlarged fragmentary longitudinal cross-section.

Figure 12 is an enlarged fragmentary horizontal cross-section taken along the line 12—12 of Figure 2, looking in the direction of the arrows.

Figure 13 is a detail longitudinal cross-section of the pallet hopper.

Figure 14 is a semi-diagrammatic side elevation of the invention.

Referring now to the drawings in detail wherein like reference characters indicate like parts throughout the several figures, the reference character 30 indicates generally an automatic block manufacturing machine constructed in accordance with the invention.

The block machine 30 comprises a base frame 31 arranged horizontally on a supporting surface and having vertical uprights 32, 33, 34 and 35 positioned therealong in spaced relation and having identical uprights (not shown) positioned on the opposite side thereof.

An overhead frame 36 extends across the tops of the upright frame members 32, 33, 34 and 35 and is secured thereto for reasons to be assigned.

A plurality of block molding tables 37 each having a generally rectangular shape are positioned in vertically spaced parallel relation to the base frame 31. A pair of flat support webs 38 extend upwardly from the base 31 and engage opposite ends of each of the tables 37. The tables 37 are grooved as at 39 to receive the ends of the webs 38 which are secured thereto.

A block mold box 41 is formed with a plurality of cross partitions 42 and a longitudinal partition 43 arranged so that each of the tables 37 are in a separate compartment within the mold 41. The mold box 41 is provided with a plurality of slots 44 to permit the webs 38 to extend downwardly therethrough. The mold box 41 is supported for vertical movement by means of a hydraulic ram 45 positioned under each end of the mold box 41. A plurality of block cores 46 are detachably secured to the bottom of the mold box 41.

The tables 37 are each provided with a plurality of openings 48 to permit the core 46 to extend upwardly therethrough. A press ram 49 is mounted on the overhead frame member 36 and carries at its lower end an elongated press head 50 corresponding in length to the mold box 41 positioned therebelow.

The press head 50 has an upper plate 51 and a lower plate 52 arranged in spaced parallel relation and connected by a plurality of web members 53 extending therebetween and secured thereto. A movable plate 54 is positioned between the upper plate 51 and the lower plate 52 and has depending therefrom a plurality of aperture forming blades 55 which extend through the plate 52.

Coil springs 57 engage about the aperture forming blades 55 and support the plate 54 from the plate 52. A plurality of bearing brackets 58 are mounted on the underside of the upper plate 51 and have journalled therein cam shafts 59. Rotatable circular cams 60 are carried by the cam shafts 59 and the cams 60 are in engagement with the upper surface of the movable plate 54. Each of the cam shafts 59 are provided with a gear 61 on one end thereof.

A motor 70 is mounted on the top of the upper plate 51 and has a gear box 71 associated therewith with a drive shaft 72 extending downwardly therefrom to a worm gear 73 engaged with a spider 74.

Operation of the motor 70 will rotate the cam shafts 59 and cams 60 depressing the plate 54 thus moving the aperture forming blades 55 through the lower plate 52 against the tension of the springs 57. Continued rotation of the shaft 59 will cause the cams 60 to move upwardly permitting the springs 57 to return the plate 54 and the aperture forming blades 55 to their upper position with the blades 55 retracted from the plate 52 so that the aperture forming blades 55 are completely within the head 50.

A pair of oppositely disposed longitudinally extending angle iron tracks 76 and 77 are carried by the vertical upright members 32, 33, 34 and 35 and the opposite upright members (not shown). The rails 76 and 77 are positioned above the tables 37 and below the upper position of the head 50.

A batch hopper 78 is provided with a plurality of support wheels 79 which are movably supported on the tracks 76 and 77.

A supply hopper 81 is positioned adjacent the press head 50 in overlying relation to the batch hopper 78 when the batch hopper 78 is in position to be loaded at one end of the rails 76 and 77. The batch hopper is adapted to move on the rails 76 and 77 to a position overlying the tables 37.

A plurality of block pallets 82, referring particularly to Figures 5 through 9, are formed of generally rectangular configuration having a top wall 83, a bottom wall 84, side walls 85, and opposite end walls 86 and 87. The pallets 82 are provided with a plurality of core receiving openings 88 corresponding to the cores 46 in the mold box 41, and a plurality of apertures 89 corresponding to the blades 55 in the press head 50. The end 86 of the block 82 is slotted as at 90 adjacent one side edge thereof, with the slot 90 opening through the bottom wall 84, as best seen in Figure 6.

A bolt 91 is mounted in the slot 90 and secured therein on a pivot bolt 92 so as to swing into and out of the slot 90. A coil spring 93 engages about the pivot bolt 92 and has one end thereof connected to the bolt 91 at 94, while the opposite end thereof engages against the base of the slot 90. The bolt 91 has a T-shaped head 95 formed on its end opposite the pivot bolt 92 with the surfaces of the head 95 formed on an arc formed from the pivot 92.

The end 87 of the block 82 has a T-shaped slot 96 formed therein in alignment with the slot 90 and arranged so as to be engaged by the head 95 on the bolt 91, as illustrated in Figure 6, to lock adjacent pallets 82 together. The opposite side edge of the end 86 of the pallet 82 is provided with a T-shaped slot 96, while the opposite side edge of the end 87 of the pallet 82 is provided with a bolt structure 91.

The bolts 91 are positioned equidistance from the side edges 85 of the pallet 82 so that when the ends of adjacent pallets are brought together, the bolts 91 of each will line up with the T-shaped slots 96 of the other to provide two locking connections between adjacent ends of the pallets 82.

During the molding operation, the pallets 82 are adapted to be positioned in overlying relation to each of the tables 37, and following the molding operation to be removed therefrom.

In Figure 13 a pallet supply hopper 98 is illustrated. A hydraulic ram 99 is mounted on the base 31 below the hopper 98 and carries an elevated platform 100 on its upper end which is movable within the hopper 98 to raise the pallets 82 to a discharge position.

A roller supported belt conveyor 101 is positioned in alignment with the top of the hopper 98 and the tables 37 so that the pallets 82 may be transported thereover to bring them into position within the molding machine 30. A roller supported belt conveyor 102 extends from the end of the block molding machine 30 opposite the conveyor 101 to remove the pallets 82 from the machine. The conveyors 101 and 102 are adapted to be driven by any conventional mechanism.

In the use and operation of the invention, beginning with no material in the molding machine 30, pallets 82 are moved upwardly by the elevator 100 and forwardly by the belt conveyor 101. As each pallet 82 reaches the top of the hopper 98, it automatically couples with the preceding pallets 82 by having the adjacent bolts 91 engaged in the adjacent T-shaped slot 96. Pallets 82 are fed through the machine until each table 37 has a pallet 82 thereon. The block mold box 41 is then elevated and the cross partitions 42 will strike the bolts 91 moving them into their slots 90, as illustrated in Figure 7.

The mold box 41 is lowered after the molding operation permitting the bolts 91 to engage the T slots 96 again connecting the pallets 82 together in a train or chain. The pallets 82 are then moved outwardly onto the conveyor 102 to a point of discharge. Simultaneously with the moving out of the pallets 82 new pallets 82 supplied from the hopper 98 feed into the machine so that as the last block containing pallet 82 leaves the discharge end of the machine a complete set of unfilled pallets 82 are positioned on the tables 37.

Having thus described the preferred embodiment of the invention, it should be understood that numerous structural modifications and adaptations may be resorted to without departing from the scope of the appended claims.

What is claimed is:

1. In a molding press for forming cementitious blocks a block pallet comprising a generally rectangular body having parallel opposite side walls, parallel opposite end walls, an upper wall and a lower wall, said body having a slot formed in one end wall adjacent one side wall communicating through said bottom wall, a bolt pivoted in said slot having means normally spring biasing said bolt to an extended position, a T head formed on the end of said bolt opposite said pivot, and a T slot formed in said end wall adjacent the side wall opposite to said first slot with said T slot being adapted to receive the T head of the bolt on the next adjacent pallet locking the pallets together.

2. A device as claimed in claim 1 wherein the bottom edge of said bolt in extended position is sloped upwardly towards its outer end to provide a cam surface.

3. A device as claimed in claim 1 wherein the opposite ends of said pallet are provided with identical bolt and slot constructions.

References Cited in the file of this patent

UNITED STATES PATENTS

| | | |
|---|---|---|
| 57,791 | Stafford | Sept. 4, 1866 |
| 930,053 | Diefendorf | Aug. 3, 1909 |
| 1,238,049 | Pearson | Aug. 21, 1917 |
| 1,481,686 | Caldwell | Jan. 22, 1924 |
| 1,528,582 | Straub | Mar. 3, 1925 |
| 1,577,383 | Straub | Mar. 16, 1926 |
| 1,699,017 | Poore | Jan. 15, 1929 |
| 1,921,003 | Romie | Aug. 8, 1933 |
| 2,586,210 | Corwin | Feb. 19, 1952 |
| 2,652,613 | Warren | Sept. 22, 1953 |